Patented June 3, 1947

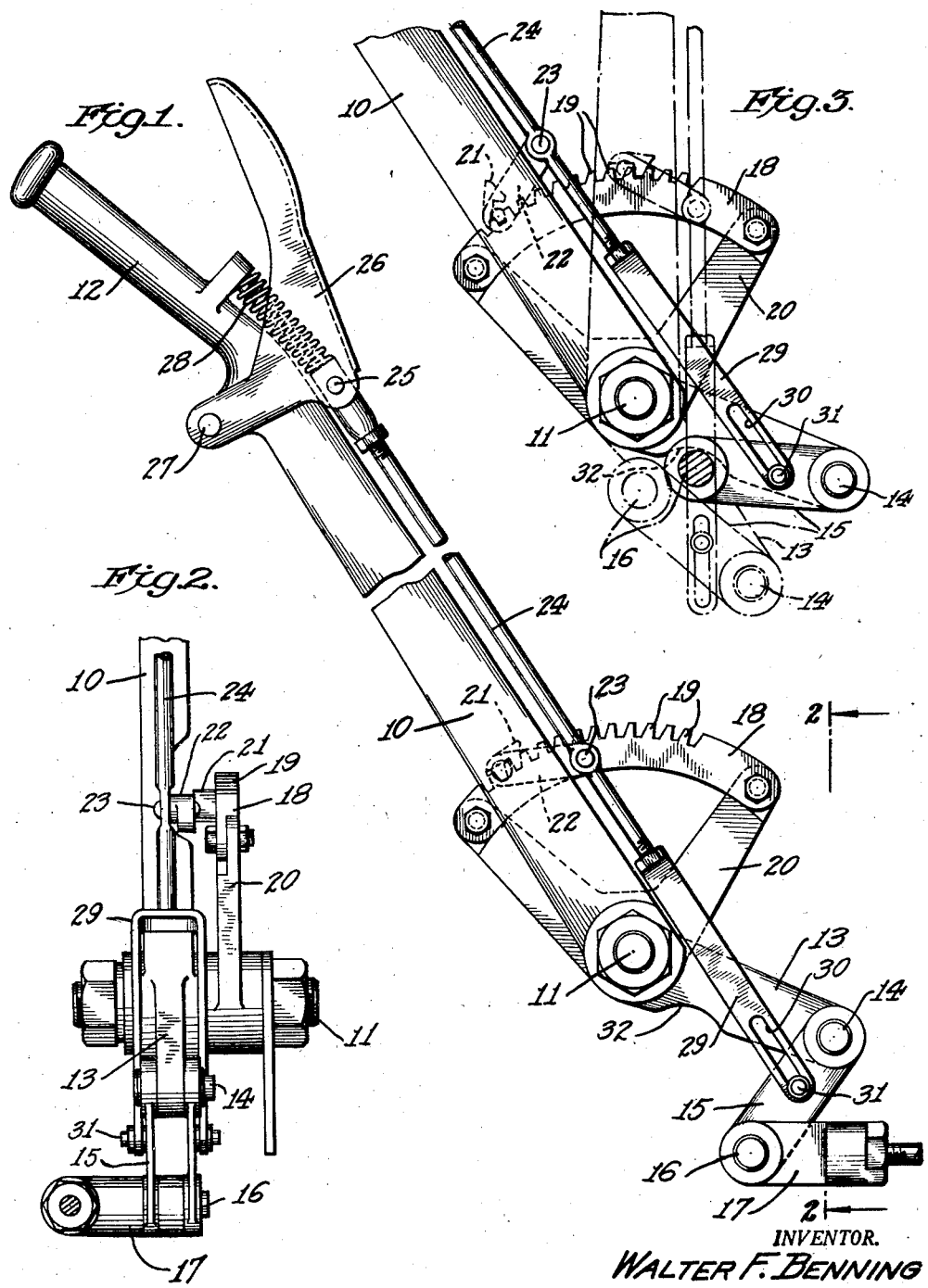

2,421,405

UNITED STATES PATENT OFFICE 2,421,405

EMERGENCY BRAKE LEVER

Walter F. Benning, Toledo, Ohio, assignor to Mack Manufacturing Corporation, New York, N. Y., a corporation of Delaware Application January 31, 1945, Serial No. 575,389

6 Claims. (Cl. 74—518)

The present invention relates to hand brake control mechanisms and embodies, more specifically, an improved form of brake operating mechanism wherein the manual force available for operating the brake is applied more effectively to assert braking pressure.

More specifically, the invention embodies an improved hand brake lever by means of which the slack in the brake mechanism is taken up in the initial operation and prior to actuation of the lever.

An object of the invention resides in providing a manual brake operating mechanism by means of which the manual force available for applying the brakes is more effectively utilized than in mechanisms heretofore available.

A further object of the invention is to provide a manual brake operating mechanism wherein means is provided initially to take up the slack in the brake mechanism prior to substantial operation of the brake lever, thus reserving the movement of the brake lever for the application of the braking forces.

The foregoing objects are attained in the mechanism hereinafter described by providing a pivoting brake lever of the type commonly termed as an "emergency lever" wherein the brake lever is connected to the brake rod by means of a pivoted link which is initially actuated to take up the slack in the brake mechanism prior to pivotal movement of the brake lever to apply braking force to the mechanism.

Other and further objects of the invention will appear as it is described in greater detail in connection with the accompanying drawing, wherein Figure 1 is a view in side elevation showing a brake lever constructed in accordance with the present invention;

Figure 2 is a view in end elevation, partly in section on the line 2—2 of Figure 1, and looking in the direction of the arrows; and Figure 3 is a view similar to Figure 1 showing the manner in which the mechanism takes up the slack in the brake mechanism and the manner in which the brake mechanism is actuated.

Referring to the above drawings, a brake lever is shown at 10 as pivoted on the vehicle chassis at 11. The lever is provided with a manually operated handle 12 and an arm 13 provided with a pivoted connection 14 at the end thereof. A link 15 is pivoted at 14 to the arm 13 and, at 16, to the brake rod 17.

In order that the brake lever may be secured in any desired position, a stationary sector 18 is formed with a plurality of teeth 19 and is mounted upon a bracket 20. The bracket 20 is secured stationarily to the vehicle frame preferably adjacent the pivot 11 of the brake lever 10. A ratchet tooth 21 is adapted to engage between the teeth 19 on the sector and is secured to the extremity of an arm 22, which is pivoted at 23 to an axially movable rod 24. The rod 24 has its upper end pivoted at 25 to an L-shaped manually operated clasp 26, which is pivoted at 27 to the brake lever 10. A spring 28 normally urges the rod downwardly and into the position shown in Figure 1.

The lower end of the rod is formed with an extension plate 29, which is provided with a slot 30 in which a pin 31 is received, the pin 31 being secured to the link 15.

The arm 13 of the lever 10 is preferably formed with a notch 32 in which the pivot 16 of the link 15 is received when the clasp 26 is moved against the handle 12, as illustrated in Figure 3.

In operation of the mechanism, the hand of the operator first grasps the handle 12 and the clasp 26 and, squeezing the two together, lifts the rod 24 and swings the link 15 about the pivot 14. This moves the pivot connection 16 from the position shown in Figure 1 to the position shown in Figure 3. The foregoing movement of the link 15 swings the pivot connection 16 across the line of axial force asserted by the pivot connection 14 when the brake lever is moved in a brake applying direction. The resulting action is that of a toggle and the effective length of the arm 13 is thus reduced to a length equal to the distance between the centers of the pivots 11 and 16, as illustrated in Figure 3. This reduction of the lever arm results in a much greater mechanical advantage and thus increases the manual power available for applying the brakes.

It will thus be seen that, prior to pivotal movement of the brake lever 10 to apply the brakes, the slack in the brake mechanism is taken up by the movement of the brake rod 17 from the position shown in Figure 1 to the position shown in Figure 3. When the brake lever 10 is then moved along the sector 18, the movement results in the effective application of braking pressure to the brake mechanism.

While the invention has been described with reference to the structure shown in the accompanying drawings, it is not to be limited save as defined in the appended claims.

I claim:

1. A vehicle brake lever, means to pivot the lever on the vehicle chassis, hand operating means on the lever to move the lever pivotally, means on the lever to actuate brake operating mechanism, a stationary sector, a detent movable on the lever for engagement with the sector to lock the lever in desired position, means on the lever to actuate the detent, and means to actuate the brake operating mechanism by the detent actuating means.

2. A vehicle brake lever, means to pivot the lever intermediate its ends on the vehicle chassis, hand operating means on one end of the lever to move the lever pivotally, a stationary sector, a locking detent movably mounted on the lever and adapted to engage the sector to lock the lever in desired positions, manually operated means on the lever to actuate the detent, a link pivoted to the other end of the lever, brake actuating means pivoted to the link, and means to actuate the link by the last named manually operated means.

3. A vehicle brake lever, means to pivot the lever intermediate its ends on the vehicle chassis, hand operating means on one end of the lever to move the lever pivotally, a stationary sector, a locking detent movably mounted on the lever and adapted to engage the sector to lock the lever in desired positions, manually operated means on the lever to actuate the detent, a link pivoted to the other end of the lever, brake actuating means pivoted to the link, and means to actuate the link by the last named manually operated means to shift the point of connection of the link with the brake actuating means to the opposite side of the point of connection of the lever with the link in relation to the direction of application of force from the lever to the brake actuating means.

4. The combination of a vehicle brake lever, means pivotally supporting said lever intermediate of its ends, manipulative means on one end of said lever to operate said lever, a stationary sector, a locking detent movably mounted on the lever and adapted to engage said sector to lock the lever in any of its positions, manually operated means on the lever for actuating said detent, a link pivoted on the other end of said lever, brake actuating means pivoted to said link, and a pin and slot connection between said manually operated means and said link for rocking said link toward said lever in the direction of the pivot of said lever as said detent is disengaged from said sector, said connection being ineffective to rock the link in the opposite direction.

5. The combination of a moveable brake operating means, means connecting the same to a brake, means for holding the brake operating means against any movement, means for releasing the holding means, and a connection between the releasing means and the connecting means for simultaneously taking up slack in the connecting means and releasing the holding means.

6. The combination of a moveable brake operating means, means connecting the same to a brake, means for holding the brake operating means against any movement, means for releasing the holding means, and a one-way operating means between the releasing means and the connecting means for simultaneously taking up slack in the connecting means and releasing the holding means.

WALTER F. BENNING.

REFERENCES CITED

The following references are of record in the file of this patent:

UNITED STATES PATENTS

| Number | Name | Date |
| --- | --- | --- |
| 1,554,752 | Moses | Sept. 22, 1925 |

FOREIGN PATENTS

| Number | Country | Date |
| --- | --- | --- |
| 631,893 | Germany | June 29, 1936 |
| 365,901 | Great Britain | Jan. 28, 1932 |
| 309,718 | Italy | July 14, 1933 |